United States Patent [19]
Yamate et al.

[11] Patent Number: 5,212,429
[45] Date of Patent: May 18, 1993

[54] RASTER POSITION ADJUSTING CIRCUIT

[75] Inventors: Kazunori Yamate; Hideo Kinoshita, both of Osaka; Chikara Uenishi, Chigasaki; Masafumi Ugajin; Shinichi Kidokoro, both of Fujisawa; Hiroshi Yamagiwa, Kamakura, all of Japan

[73] Assignee: Matsushita Electric Industrial Co., Ltd., Osaka, Japan

[21] Appl. No.: 837,957

[22] Filed: Feb. 20, 1992

[30] Foreign Application Priority Data

Feb. 27, 1991 [JP] Japan .................... 3-32790

[51] Int. Cl.$^5$ .................... G09G 1/04; H01J 29/54
[52] U.S. Cl. .................................... 315/398
[58] Field of Search ............... 315/398, 387, 390, 367

[56] References Cited
U.S. PATENT DOCUMENTS 3,814,981 6/1974 Rusk .................................... 315/398
4,675,581 6/1987 Dietz .................................... 315/398
4,703,233 10/1987 Rodriguez-Cavazos ........... 315/398

Primary Examiner—Gregory C. Issing
Attorney, Agent, or Firm—Pollock, VandeSande & Priddy

[57] ABSTRACT

A raster position adjusting circuit for controlling the raster position on a CRT, the circuit being equipped with a constant-current supply source and a voltage-controlled type current supply source which are coupled to each other. The drawing current of the voltage-controlled type current supply source is arranged to be controllable in accordance with the output voltage from a digital-to-analog converter, thereby controlling the emitter-base voltages of first and second transistors connected to a junction point between both the current supply sources. This control of the emitter-base voltages of the first and second transistors allows the control of the direction and value of a current flowing through a horizontal deflecting coil, thereby effecting the raster position adjustment.

4 Claims, 3 Drawing Sheets

RASTER POSITION ADJUSTING CIRCUIT

BACKGROUND OF THE INVENTION

The present invention relates to a raster position adjusting circuit for controlling a horizontal raster position of an electromagnetic type cathode ray tube (which will be referred hereinafter to as a CRT).

FIG. 1 is an illustration of an arrangement of a conventional raster position adjusting circuit including a first power source Vcc1 designated at numeral 1 and a second power source Vcc2 designated at numeral 2, the first power source Vcc1 being for the circuit and the second power source Vcc2 being for supplying a direct current to a horizontal deflecting coil 9. The horizontal raster is made by supplying a direct current to the horizontal deflecting coil 9 and the horizontal right and left raster position adjustment can be effected by means of current path systems indicated by arrows A (chain line) and B (dotted line) in FIG. 1. The horizontal deflection circuit is basically composed of the first power source Vcc1, a constant-voltage source 3, a flyback transformer 8, the horizontal deflecting coil 9, a direct-current blocking capacitor 10, and a horizontal output circuit 11, and additionally equipped with a choke coil 12 (which prevents the horizontal pulse from being by-passed), resistors 6, 7, transistors 4, 5, a control 13 and the second power source Vcc2 in order to change the raster position. A partial voltage of the second power source Vcc2 due to the position of a movable contact of the control 13 is applied to the bases of both the transistors 4 and 5 whereby either the transistors 4 and 5 turns ON in accordance with the applied voltage due to the volume 13 in relation to the same emitter electric potential so as to supply a current to the horizontal deflecting coil 9 through the current path system indicated by the arrow A or B.

There is a problem which arises from such a conventional raster position adjusting circuit using the control 13, however, in that there is the possibility of lowering its reliability due to an imperfect connection of the movable contact because the control 13 has a mechanical structure, and difficulty is encountered to easily achieve the automization of the adjustment of the raster position in the manufacturing process because of requiring a dedicated device for operation of the control. In addition, the position for the provision of the control is restricted on the printed circuit board.

SUMMARY OF THE INVENTION

It is therefore an object of the present invention to provide a raster position adjusting circuit which allows easy automization of the adjustment of the raster position in the manufacturing process.

One feature of the raster position adjusting circuit according to the present invention is that, with the grounded sides of first and second voltage sources being arranged so as not to be coupled to each other, the voltage supply side of the first voltage source is coupled to one terminal of a current supply source whose current supply ability is I amperes, and is further coupled to a constant-voltage source. A voltage-controlled type current supply source whose maximum current drawing ability is two times the current supply ability I of the current supply source is at one terminal coupled to the other terminal of the current supply source and at the other terminal coupled to the grounded side of the first voltage source and is arranged to be responsive to the output voltage of a digital-to-analog (D/A) converter. Further, a junction point between the current supply source and the voltage-controlled type current supply source is connected to one terminal of a first resistor and bases of first and second transistors, the other terminal of the first resistor and emitters of the first and second transistors are coupled to each other. The coupling point is coupled to an output terminal of the constant-voltage source. A collector of the first transistor is coupled to a voltage supply side of the second voltage source and a collector of the second transistor is coupled to a grounded side of the second voltage source, one terminal of a second resistor is coupled to a junction point between the collector of the first transistor and the second voltage source and one terminal of a third resistor is coupled to a junction point between the collector of the second transistor and the second voltage source. The other terminal of the second resistor and the other terminal of the third resistor is coupled to each other. One terminal of a primary side of a flyback transformer is coupled to the junction point between the emitters of the first and second transistors. The output terminal of the constant-voltage source and the other terminal of the primary side thereof is coupled to a horizontal output circuit, one terminal of a horizontal deflecting coil is coupled to a junction point between the other terminal of the primary side of the flyback transformer and the horizontal output circuit and the other terminal of the horizontal deflecting coil is coupled to one terminal of a direct-current blocking capacitor. The other terminal of the direct-current blocking capacitor is coupled to the grounded side of the first voltage source, one terminal of a choke coil is coupled to a junction point between the second and third resistors, and the other terminal of the choke coil is coupled to a junction point between the horizontal deflecting coil and the direct-current blocking capacitor.

With this circuit arrangement, in the case of changing the raster position by supplying direction-different currents to the horizontal deflecting coil, a difference current between the currents of the current supply source and the voltage-controlled current supply source flows through the first resistance provided between the emitters and bases of the first and second transistors, whereby the first transistor turns ON and the second transistor turns OFF, or the second transistor turns ON and the first transistor turns OFF. At this time, since the voltage between the emitters and bases of the first and second transistors varies in accordance with the current value flowing through the first resistor, it is possible to control the current from the emitter of the first transistor to the emitter of the second transistor. Further, since in this operation the drawing current of the voltage-controlled type current supply source is controllable in a range from 0 to 2I amperes in accordance with the output voltage of the D/A converter, when the drawing current thereof is from 0 to a value smaller than I, the difference current between the current due to the current supply source and the drawing current of the voltage-controlled type current supply source is introduced into the first resistor, because the current supply ability I of the first current supply source is constant, so that the base voltage viewed from the emitter of the first transistor increases, and hence the first transistor operates and the second transistor stops to operate. On the other hand, when the drawing current of the voltage-controlled type current supply source is I to 2I, the difference current therebetween is discharged through the first resistor whereby the first transistor stops to operate and the second transistor starts to operate.

In accordance with the present invention, there is also provided a raster position adjusting circuit for use in a cathode ray tube, comprising: horizontal deflection means including a deflecting coil for deflecting an electron beam directing to a screen of the cathode ray tube; constant-current supply means for supplying a constant current; voltage-controlled type current supply means coupled to the constant-current supply means and arranged such that its drawing current is controllable in accordance with an external voltage signal; and switching means coupled to a junction point between the constant-current supply means and the voltage-controlled type current supply means and further coupled to the deflecting coil of the horizontal deflection means, the switching means being arranged so as to control a current flowing through the deflecting coil in accordance with a difference current between the constant-current supply means and said voltage-controlled type current supply means to adjust a position of a raster on the screen of the cathode ray tube.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
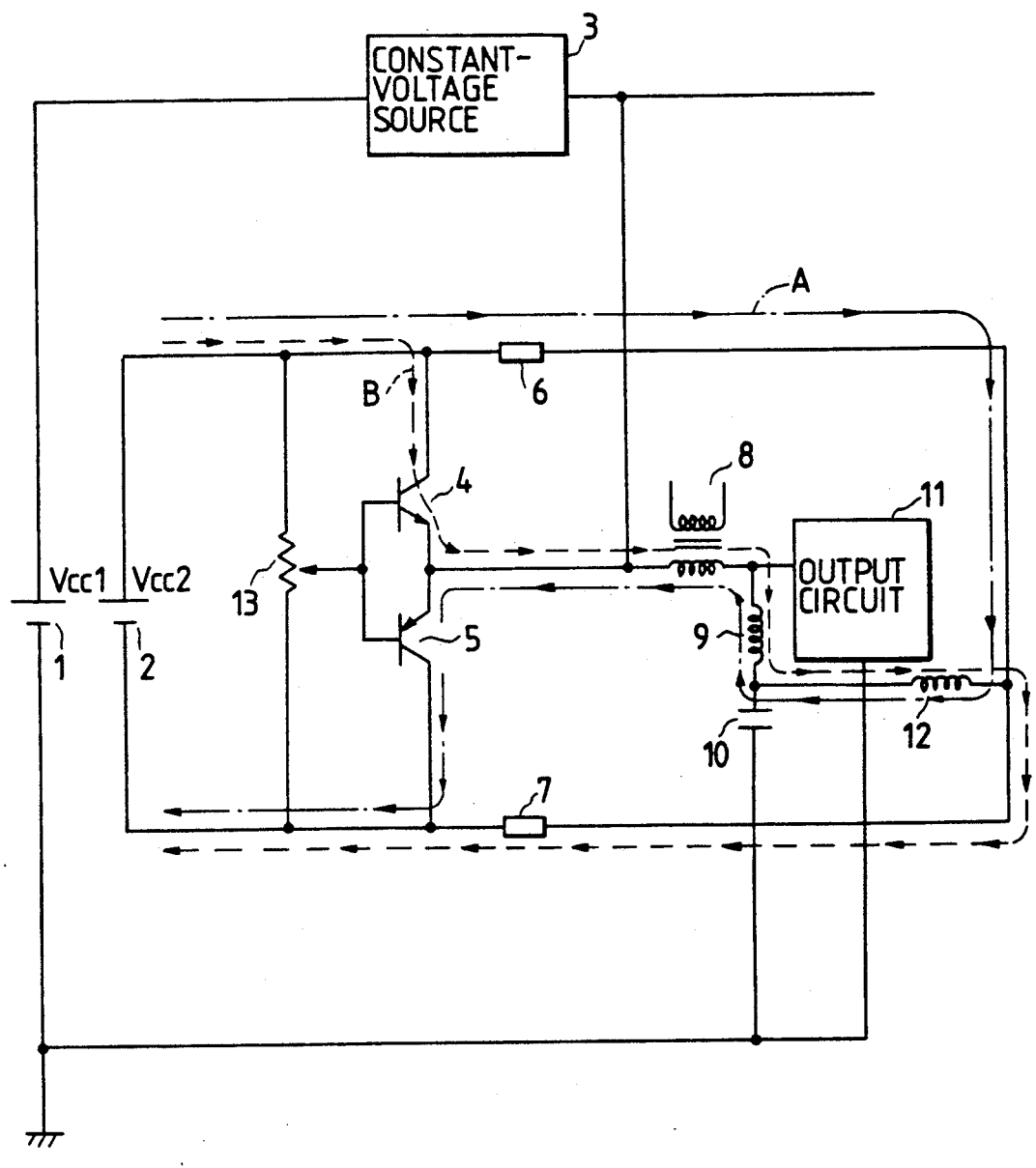
FIG. 1 shows an arrangement of a conventional raster position adjusting circuit.
Figure 2:
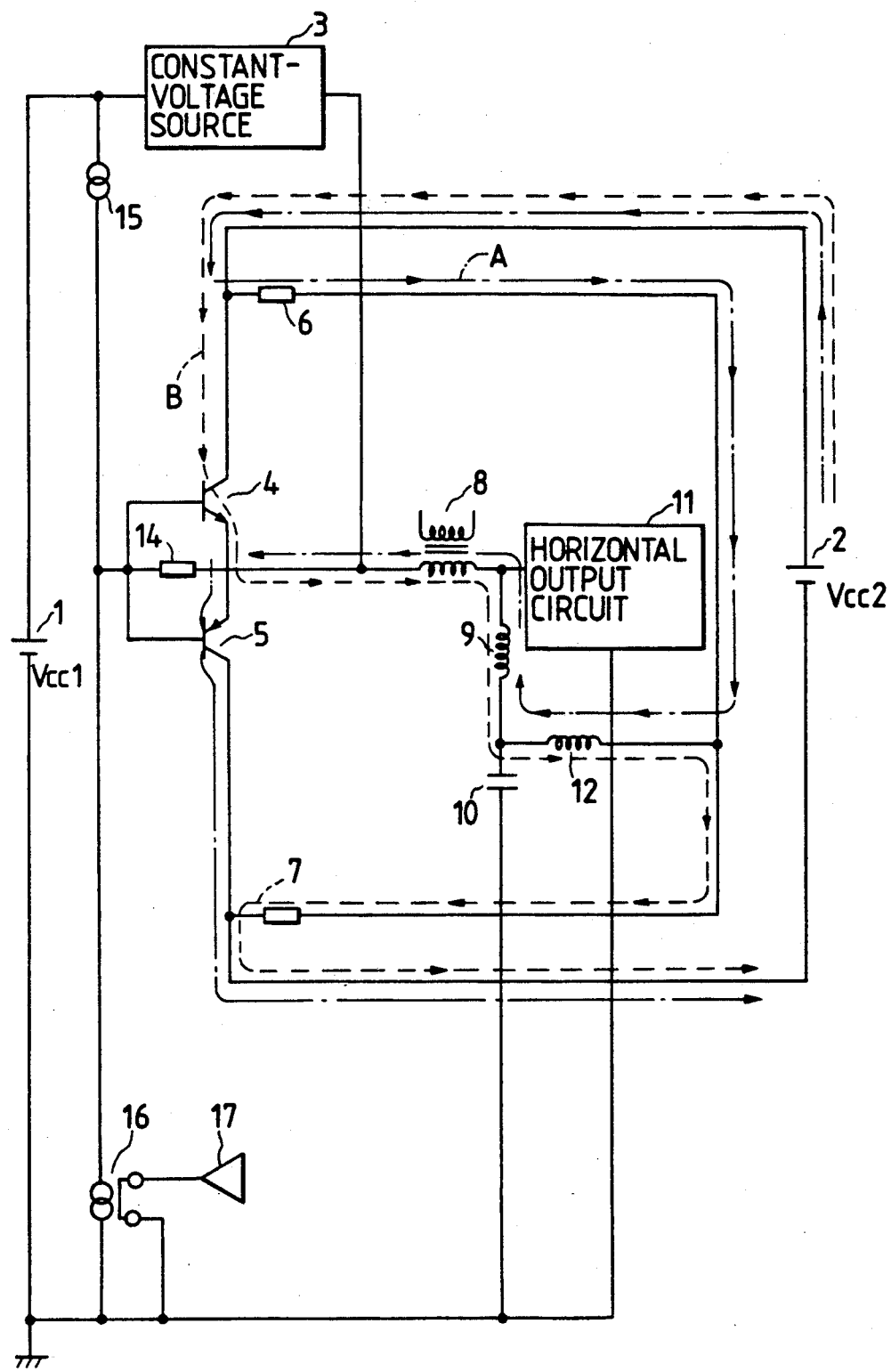
FIG. 2 illustrates an arrangement of a raster position adjusting circuit according to an embodiment of the present invention.

Referring now to FIG. 2, there is illustrated an arrangement of a raster position adjusting circuit according to an embodiment of the present invention where parts corresponding to those in FIG. 1 showing the conventional raster position adjusting circuit are marked with the same characters and numerals. In FIG. 2, this raster position adjusting circuit comprises a horizontal deflection circuit including a power source (Vcc1) 1, a constant-voltage source 3, a flyback transformer 8, a horizontal output circuit 11, a horizontal deflecting coil 9, and a direct-current blocking capacitor 10. Further, provided are a pair of first and second transistors 4, 5, first to third resistors 14, 6, 7, a choke coil 12 and a power source (Vcc2) 2, thus basically making up a raster position adjusting circuit which effects the position adjustment of the horizontal raster on a CRT. More specifically, this raster position adjusting circuit is first arranged such that the grounded sides of the power sources 1 and 2 are not coupled to each other. The raster position adjusting circuit is additionally equipped with a first current supply source (constant-current supply source) 15 whose current supply ability is I (ampere) and a voltage-controlled type current supply source (a second current supply source) 16 whose maximum current drawing ability in 2 times the current supply ability I of the first current supply source 15. The first current supply source 15 is at one terminal connected to the voltage supply side of the power source 1. The voltage supply side of the power source 1 is also connected to a constant-voltage source 3. The other terminal of the first current supply source 15 is connected to one terminal of the voltage-controlled type current supply source 16, the other terminal of the voltage-controlled type current supply source 16 being coupled to the grounded side of the power source 1. The voltage-controlled type current supply source 16 is in a coupling relation to a DA (digital-to-analog) converter 17 so as to be responsive to the output voltage thereof.

A junction point between the first current supply source 15 and the voltage-controlled type current supply source 16 is coupled to one terminal of the first resistor 14 and further connected to the bases of the first and second transistors 4 and 5. The emitters of the first and second transistors 4, 5 and the other terminal of the first resistor 14 are directly coupled to each other at a coupling point which is in turn coupled to the output terminal of the constant-voltage source 3. The collector of the first transistor 4 is coupled to the supply side of the power source 2 and the collector of the second transistor 5 is coupled to the grounded side of the power source 2. Further, a junction point between the collector of the first transistor 4 and the power source 2 is connected to one terminal of the second resistor 6, and a junction point between the collector of the second transistor 5 and the power source 2 is connected to one terminal of the third resistor 7. The other terminals of the second and third resistors 6 and 7 are coupled to each other.

Moreover, one terminal of the primary side of the flyback transformer 8 is connected to a junction point between the emitters of the first and second transistors 4, 5 and the output terminal of the constant-voltage source 3, and the other terminal of the primary side thereof is coupled to the horizontal output circuit 11 whose grounded terminal is coupled to the grounded side of the power source 1. A junction point between the flyback transformer 8 and the horizontal output circuit 11 is connected to one terminal of the horizontal deflecting coil 9, the other terminal of the horizontal deflecting coil 9 being coupled through the direct-current blocking capacitor 10 to the grounded side of the power source 1. Further, one terminal of the choke coil 12 is connected to a junction point between the second and third resistors 6 and 7 and the other terminal of the choke coil 12 is connected to a junction point between the horizontal deflecting coil 9 and the direct-current blocking capacitor 10. The choke coil 12 is for preventing a horizontal pulse from the introduction into the raster position adjusting circuit. With a base voltage viewed from the emitters of the first and second transistors 4, 5 being applied to the bases thereof, currents indicated by characters A and B in FIG. 2 flow through the horizontal deflecting coil 9, thereby allowing the raster position adjustment.

A base voltage is applied to each of the first and second transistors 4 and 5 due to a current flowing through the first resistor 14. This base voltage occurs because the difference between the current of the constant-voltage source 15 having the current supply ability I (ampere) and the current of the voltage-controlled type current supply source 16 having the maximum current drawing ability 2I is introduced and discharged into and from the first resistor 14. Here, the drawing current is controllable by the DA converter 17 in a range from 0 to 2I. Thus, in the case that the drawing current of the voltage-controlled type current supply source 16 is 0 to a value which does not reach I, a portion of the current I of the constant-current supply source 15 is introduced into the voltage-controlled type current supply source 16 and the other current thereof which cannot be introduced thereinto passes through the first resistor 14. Hence when viewed from the emitters of the first and second transistors 4 and 5, the base voltages of the first and second transistors 4 and 5 increase. At this time, since the first transistor 4 is a NPN transistor and the second transistor 5 is a PNP transistor, although the second transistor 5 takes the non-energizing (turning-OFF) state, the first transistor 4 takes the energizing (turning-ON) state whereby the current flows in the direction indicated by the arrow B in FIG. 2. On the other hand, in the case that the drawing current of the voltage-controlled type current supply source 16 is I to 2I, since the current supply ability of the constant-current source 15 is I, the remaining current flows through the first resistor 14 and therefore, when viewed from the emitters of the first and second transistors 4 and 5, the base voltages of the first and second transistors 4 and 5 decrease. Accordingly, the NPN transistor 4 stops to operate and the PNP transistor 5 starts to operate so that the current flows in the direction indicated by the arrow A in FIG. 2. That is, with the current of the voltage-controlled type current supply source 16 being controllable by the voltage applied from the DA converter 17, the base-emitter voltages of the first and second transistors 4 and 5 vary in accordance with the introduction and discharge into and from the first resistor 14, whereby it is possible to change the direction and value of the deflecting-coil-flowing current (A, B) to allow the raster position adjustment.

As described above, according to this invention, the electronic control of the current flowing through the deflecting coil can be effected with the emitter-base voltages being applied to the first and second transistors on the basis of the current between the constant-current supply source and the voltage-controlled type current supply source which is controllable through the DA converter 17. This arrangement allows the improvement of the reliability of the circuit and the computer-based automization unlike the conventional circuit using a mechanical volume.

Figure 3:
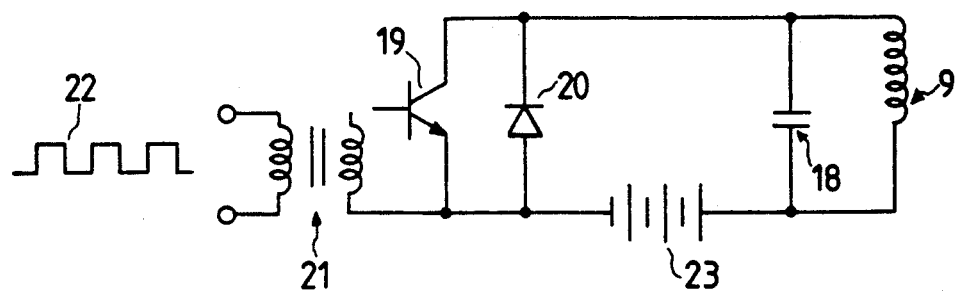
FIG. 3 is a schematic drawing of a horizontal output circuit 11, used in the raster positioning device of FIG. 2.

FIG. 3 shows one example of the above-mentioned horizontal output circuit 11. This horizontal output circuit is for intermitting the voltage to the deflecting coil 9 in accordance with the period of the horizontal frequency 22 so as to supply a sawtooth current to the horizontal deflecting coil 9. As illustrated in FIG. 3, the horizontal output circuit 11 comprises a drive transformer 21, a horizontal output transistor 19, a damper diode 20, a direct-current power source 23 and a resonance capacitor 18. In addition to the supply of the sawtooth current to the horizontal deflecting coil 9, the horizontal output circuit 11 also has a purpose of supplying a power to the other circuits by using the flyback pulse generated in its own circuit.

Figure 4:
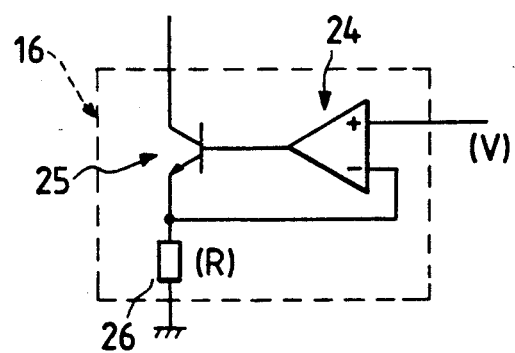
FIG. 4 is a schematic drawing of a voltage controlled current supply source 16 used in the raster positioning device of FIG. 2.

FIG. 4 illustrates one example of the voltage-controlled type current supply source 16. This voltage-controlled type current supply source 16 is arranged to vary the current drawing ability in accordance with the input voltage. In FIG. 4, the voltage-controlled type current supply source 16 is operated so that the +input voltage terminal and the —input voltage terminal of an operational amplifier 24 become equal to each other, and hence the value of the DC voltage becomes equal to the emitter voltage of a transistor, whereby the emitter current having a value of (V/R) flows. V represents the value of the DC voltage and R designates the value of a resistor 26.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A raster position adjusting circuit comprising: first and second voltage sources; a current supply source; a constant-voltage source; a voltage-controlled type current supply source; a digital-to-analog converter; a flyback transformer; a horizontal output circuit; a horizontal deflecting coil; a direct-current blocking capacitor; and a choke coil, a voltage supply side of said first voltage source being coupled to one terminal of said current supply source and further coupled to one terminal of said constant-voltage source, the other terminal of said current supply source being coupled to one terminal of said voltage-controlled type current supply source and the other terminal of said voltage-controlled type current supply source being coupled to a grounded side of said first voltage source, said digital-to-analog converter being coupled to said voltage-controlled type current supply source so that an output voltage of said digital-to-analog converter is applied thereto, a junction point between said current supply source and said voltage-controlled type current supply source being connected to one terminal of a first resistor and to bases of first and second transistors, the other terminal of said first resistor and emitters of said first and second transistors being coupled to each other and to an output terminal of said constant-voltage source, a collector of said first transistor being coupled to a voltage supply side of said second voltage source and a collector of said second transistor being coupled to a grounded side of said second voltage source, one terminal of a second resistor being coupled to a junction point between said collector of said first transistor and said second voltage source and one terminal of a third resistor being coupled to a junction point between said collector of said second transistor and said second voltage source, the other terminal of said second resistor and the other terminal of said third resistor being coupled to each other, one terminal of a primary side of said flyback transformer being coupled to the junction point between said emitters of said first and second transistors and said output terminal of said constant-voltage source and the other terminal of said primary side thereof being coupled to said horizontal output circuit, one terminal of said horizontal deflecting coil being coupled to a junction point between the other terminal of said primary side of said flyback transformer and said horizontal output circuit, and the other terminal of said horizontal deflecting coil being coupled to one terminal of said direct-current blocking capacitor, the other terminal of said direct-current blocking capacitor being coupled to the grounded side of said first voltage source, one terminal of said choke coil being coupled to a junction point between said second and third resistors, and the other terminal of said choke coil being coupled to a junction point between said horizontal deflecting coil and said direct-current blocking capacitor.

2. A raster position adjusting circuit as claimed in claim 1, wherein, when the current supply ability of said current supply source is taken to be I (ampere), the maximum current drawing ability of said voltage-controlled type current supply source is arranged to be 2·I (ampere).

3. A raster position adjusting circuit for use in a cathode ray tube, comprising:

horizontal deflection means including a deflecting coil for deflecting an electron beam directed to a screen of said cathode ray tube;

constant-current supply means for supplying a constant current;

voltage-controlled type current supply means coupled to said constant-current supply means and arranged such that its current is controllable in accordance with an external voltage signal; and switching means coupled to a junction point between said constant-current supply means and said voltage-controlled type current supply means and further coupled to said deflecting coil of said horizontal deflection means, said switching means being arranged so as to control a current flowing through said deflecting coil in accordance with a difference current between said constant-current supply means and said voltage-controlled type current supply means to adjust a position of a raster on said screen of said cathode ray tube.

4. A raster position adjusting circuit as claimed in claim 3, wherein, when the current supply ability of said constant-current supply means is taken to be I (ampere), the maximum current drawing ability of said voltage-controlled type current supply means is arranged to be 2·I (ampere).

* * * * *

UNITED STATES PATENT AND TRADEMARK OFFICE
CERTIFICATE OF CORRECTION

PATENT NO. : 5,212,429
DATED : May 18, 1993
INVENTOR(S) : Kazunori YAMATE, et al.

It is certified that error appears in the above-identified patent and that said Letters Patent is hereby corrected as shown below:

On the title page, item:

(30) Foreign Application Priority Data change "3-32790" to --3-32791--.

Signed and Sealed this

Eleventh Day of January, 1994

Attest:

BRUCE LEHMAN

Attesting Officer    Commissioner of Patents and Trademarks